(12) United States Patent
Egashira

(10) Patent No.: US 6,933,977 B2
(45) Date of Patent: Aug. 23, 2005

(54) IMAGE PICKUP APPARATUS HAVING AUTO-CENTERING FUNCTION

(75) Inventor: Yoshihiro Egashira, Fukaya (JP)

(73) Assignee: Kabushiki Kaisha Toshiba, Tokyo (JP)

(*) Notice: Subject to any disclaimer, the term of this patent is extended or adjusted under 35 U.S.C. 154(b) by 651 days.

(21) Appl. No.: 09/945,660

(22) Filed: Sep. 5, 2001

(65) Prior Publication Data

US 2004/0218060 A1 Nov. 4, 2004

(30) Foreign Application Priority Data

May 25, 2001 (JP) ........................................ 2001-157489

(51) Int. Cl.[7] ........................ H04N 5/222; H04N 5/228; A62B 1/04
(52) U.S. Cl. ........................ 348/333.12; 348/222.1; 348/172; 348/65
(58) Field of Search ................................ 348/335, 349, 348/333.12, 333.01, 222.1, 172, 65, 169, 170, 171, 208.99, 208.1, 219.1, 218.1, 74, 77; 600/117, 173, 118

(56) References Cited

U.S. PATENT DOCUMENTS 5,836,869 A * 11/1998 Kudo et al. ................. 600/173
5,946,030 A * 8/1999 Cooper ......................... 348/172
6,144,405 A * 11/2000 Toba .......................... 348/208.4
6,670,983 B2 * 12/2003 Abe ............................. 348/65
6,690,409 B1 * 2/2004 Takahashi ..................... 348/65

FOREIGN PATENT DOCUMENTS

| JP | 08279888 A | * 10/1996 | ............ H04N/1/21 |
| JP | 2001-046331 | 2/2001 | |
| JP | 2001046331 A | * 2/2001 | ............ A61B/1/00 |

* cited by examiner

Primary Examiner—Tuan Ho
Assistant Examiner—Lin Ye
(74) Attorney, Agent, or Firm—Pillsbury Winthrop Shaw Pittman LLP

(57) ABSTRACT

An address detector detects the position of boundary between an object image signal and other signal in an image output signal from an imaging device according to the difference in magnitude therebetween. A shift amount computation unit computes the shift amounts required to display the object at the center of a display screen according to the boundary position. A shift circuit shifts the phases of horizontal and vertical sync signals generated by a sync signal generator according to the shift amounts. A driving pulse generator generates driving pulses to drive the imaging device in response to the shifted horizontal and vertical sync signals. A sync adder adds the sync signals to the output signal of the imaging device and provides the resulting signal as a video output signal.

13 Claims, 6 Drawing Sheets

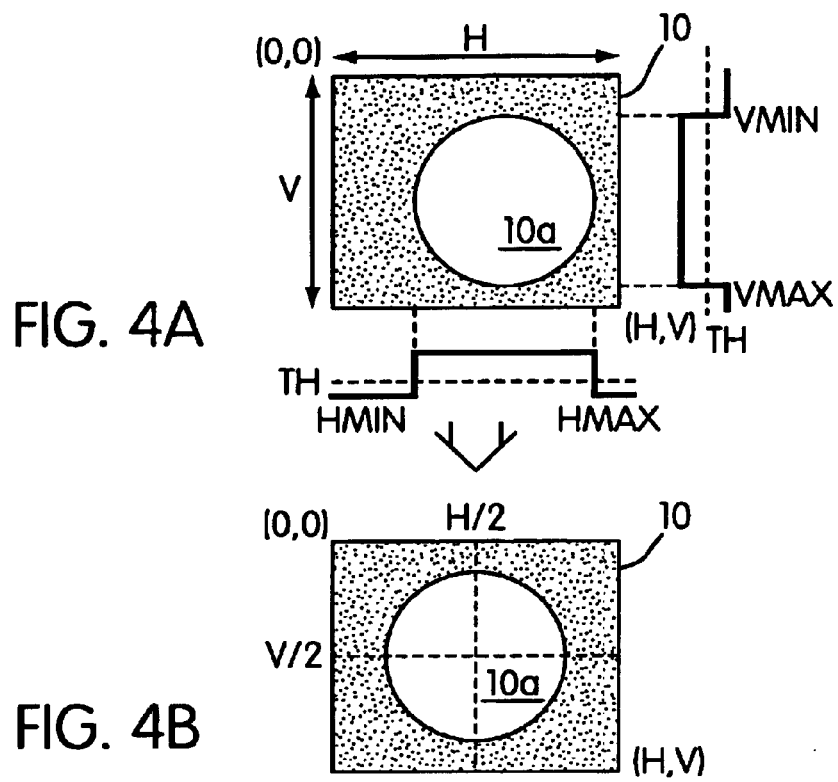
FIG. 4A
FIG. 4B
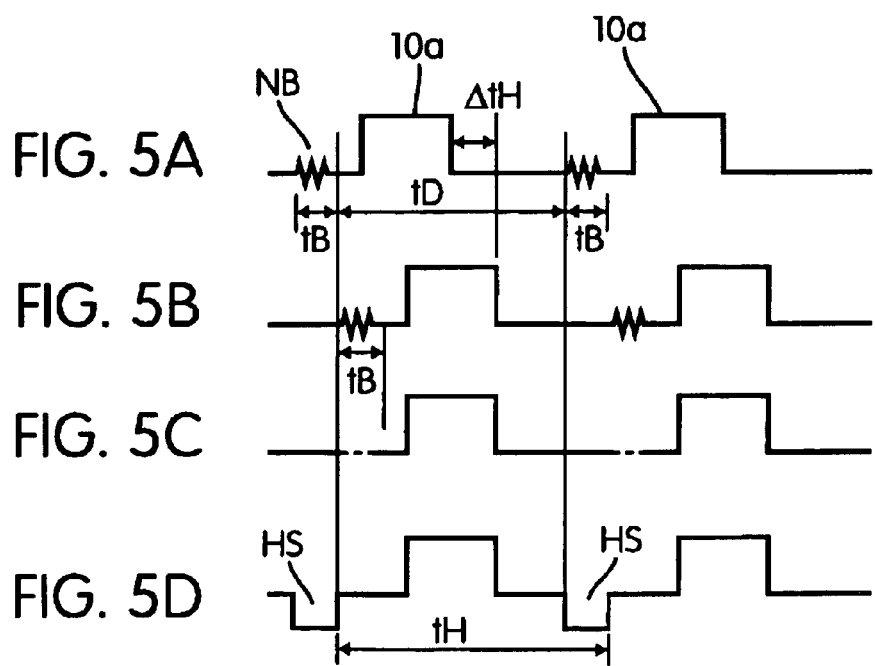
FIG. 5A
FIG. 5B
FIG. 5C
FIG. 5D

IMAGE PICKUP APPARATUS HAVING AUTO-CENTERING FUNCTION

CROSS-REFERENCE TO RELATED APPLICATIONS

This application is based upon and claims the benefit of priority from the prior Japanese Patent Application No. 2001-157489, filed May 25, 2001, the entire contents of which are incorporated herein by reference.

BACKGROUND OF THE INVENTION

1. Field of the Invention

The present invention relates to a function of automatically centering object images in image pickup apparatuses such as video cameras, electronic endscopes, etc.

2. Description of the Related Art

Small-sized, lightweight image pickup apparatuses, such as endscopes, have been widely used for medical and industrial purposes. FIG. 8 is a schematic illustration of a conventional endscope, which includes a scope 11 which is adapted to be inserted into a narrow cavity within a human body and take in reflected light from a deceased part of the body to be examined, a camera head 14 containing a prism 13 and an imaging devices 3, and an adapter 12 for coupling the scope 11 with the camera head. Note that the prism 13 is used only when three imaging devices for three primary colors are used (i.e., three-plate type).

With conventional endscopes, the registration of a circular image obtained through the scope 11 with the center of the display screen has been achieved by using high-precision parts for mounting structures and regulating adjustable parts so that the scope 11, the adapter 12, the prism 12 and the imaging devices 3 are optically aligned with one another.

Thus, the conventional endscopes entail high manufacturing costs because of the use of high-precision parts and regulation work requirements of adjustable parts. When the scope or adapter is replaced, the object image may become offset from the center (a desired position) of the display screen due to variations in the scope or adapter. In that event, the adjustable parts must be regulated again.

For instance, Japanese Patent Application KOKAI Publication No. 2001-46331 discloses a technique in which, if, in displaying an endscope image with enlargement, the image is displaced through operation of an enlargement knob, the curved portion of the end of the scope is curved according to a displacement of the image, thereby compensating for the displacement. However, this patent publication does not disclose any compensation method when the image is displaced from the desired position on the display screen.

BRIEF SUMMARY OF THE INVENTION

It is therefore an object of the present invention to provide an image pickup apparatus which, when an object image is offset from a desired position on a display screen (e.g., the center) due to misalignment between the optical axes of components (irrespective of the presence of misalignment between the optical axes of components which would cause an object image to be offset from a desired position on a display screen), allows the object image to be shifted to the desired position without regulating mechanical parts.

The image pickup apparatus of the present invention is arranged to, when the object image is off the desired position on the display screen due to misalignment between optical axes, shift the object image to the desired position on the display screen through signal processing. To this end, the position of the object image is detected through the difference in brightness level between the image signal and the other signal and the timing of sync signals in the video output is changed to vary the display start position of the object image so that it is displayed in the desired position on the display screen.

According to an aspect of the present invention, there is provided an image pickup apparatus which uses an imaging device for producing an imaging device output signal containing an object image signal representing an object image focused on its photosensitive surface which is larger than the object image and provides a video output signal corresponding to the object image, comprising: a detector which detects the position of boundary between the object image signal and the other signal in the imaging device output signal in accordance with their difference in magnitude; shift amount computing unit which computes shift amounts required to display the object image in a desired position on a display screen, based on the boundary position detected by the detector; a sync signal generator which generates sync signals to be added to the video output signal; a shift circuit which shifts the phases of horizontal and vertical sync signals generated by the sync signal generator in accordance with the shift amounts computed by the shift amount computing unit; a driving pulse generator which generates driving pulses to drive the imaging device, based on the horizontal and vertical sync signals shifted by the shift circuit; and a sync adder which adds the sync signals generated by the sync signal generator to the imaging device output signal to provide the video output signal.

The apparatus may further includes a masking circuit masking noise in the blanking portions of the imaging device output signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

FIGS. 4A and 4B show a circular image displayed on the display screen;

FIGS. 5A through 5D show unprocessed video signal waveforms and video signal waveforms processed in accordance with the principles of the invention;

DETAILED DESCRIPTION OF THE INVENTION

Figure 1:
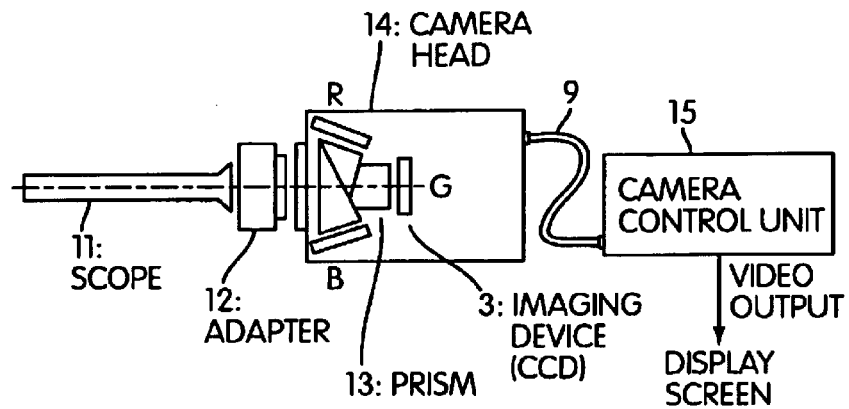
FIG. 1 shows the arrangement of an endscope to which the invention is adaptable.

FIG. 1 shows the arrangement of an endoscope system (three-plate type) which is a form of an image pickup apparatus to which the invention is adaptable. The present invention is adaptable even if the system is of a single-plate type. The endoscope system includes a scope 11 which is adapted to be inserted into a narrow cavity within a human body and take in reflected light from an object, such as a deceased part of the body, to be examined, a camera head 14 containing a prism 13 and an imaging devices 3, an adapter 12 for coupling the scope 11 with the camera head, and a camera control unit 15 that controls the camera head and provides an image captured on the imaging device 3 to a display unit in the form of a video signal. The camera head 14 and the camera control unit 15 are coupled together by a cable 9.

Figure 2:
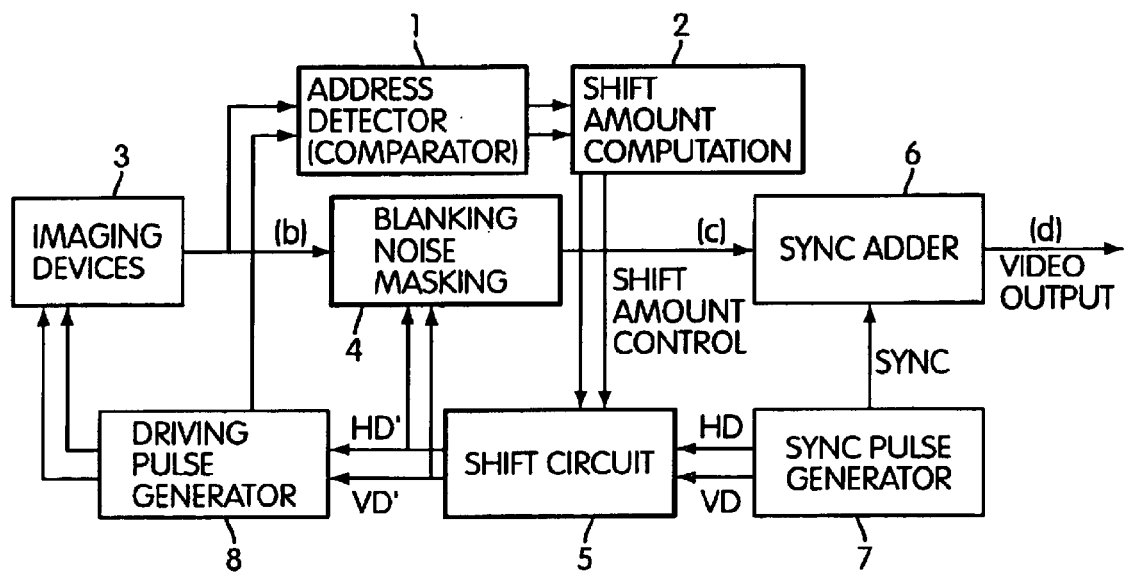
FIG. 2 is a block diagram of a signal processing system used in the endscope of FIG. 1.

In FIG. 2 there is illustrated, in block diagram form, a signal processing system for implementing the auto-centering function of the present invention which is applied to the endoscope system of FIG. 1. This embodiment illustrates an application of the present invention to an endscope system, but the principles of the present invention are equally applicable to various image pickup systems such as video cameras.

Figure 3A:
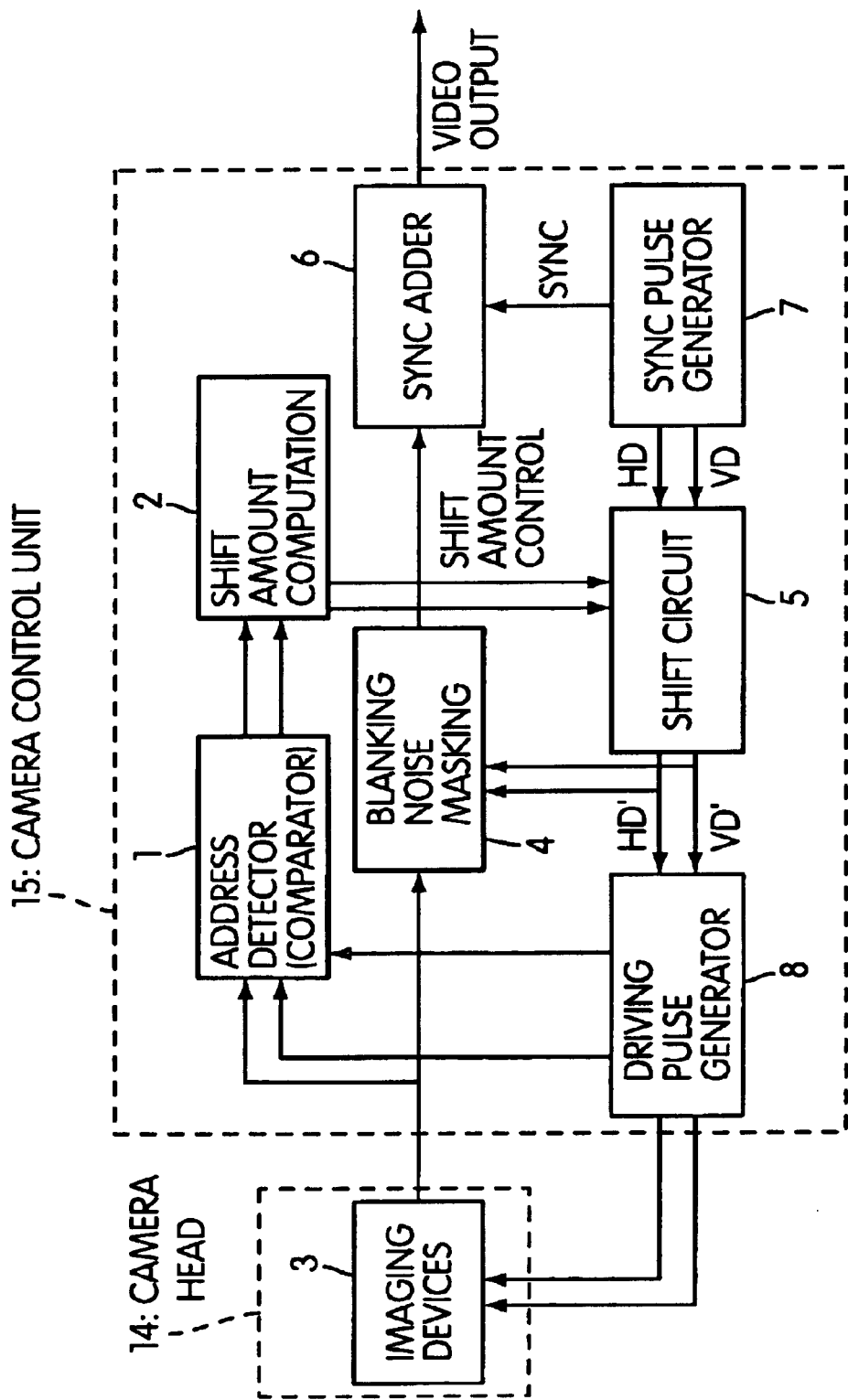
FIGS. 3A and 3B show specific arrangements of the signal processing system of FIG. 2.
Figure 3B:
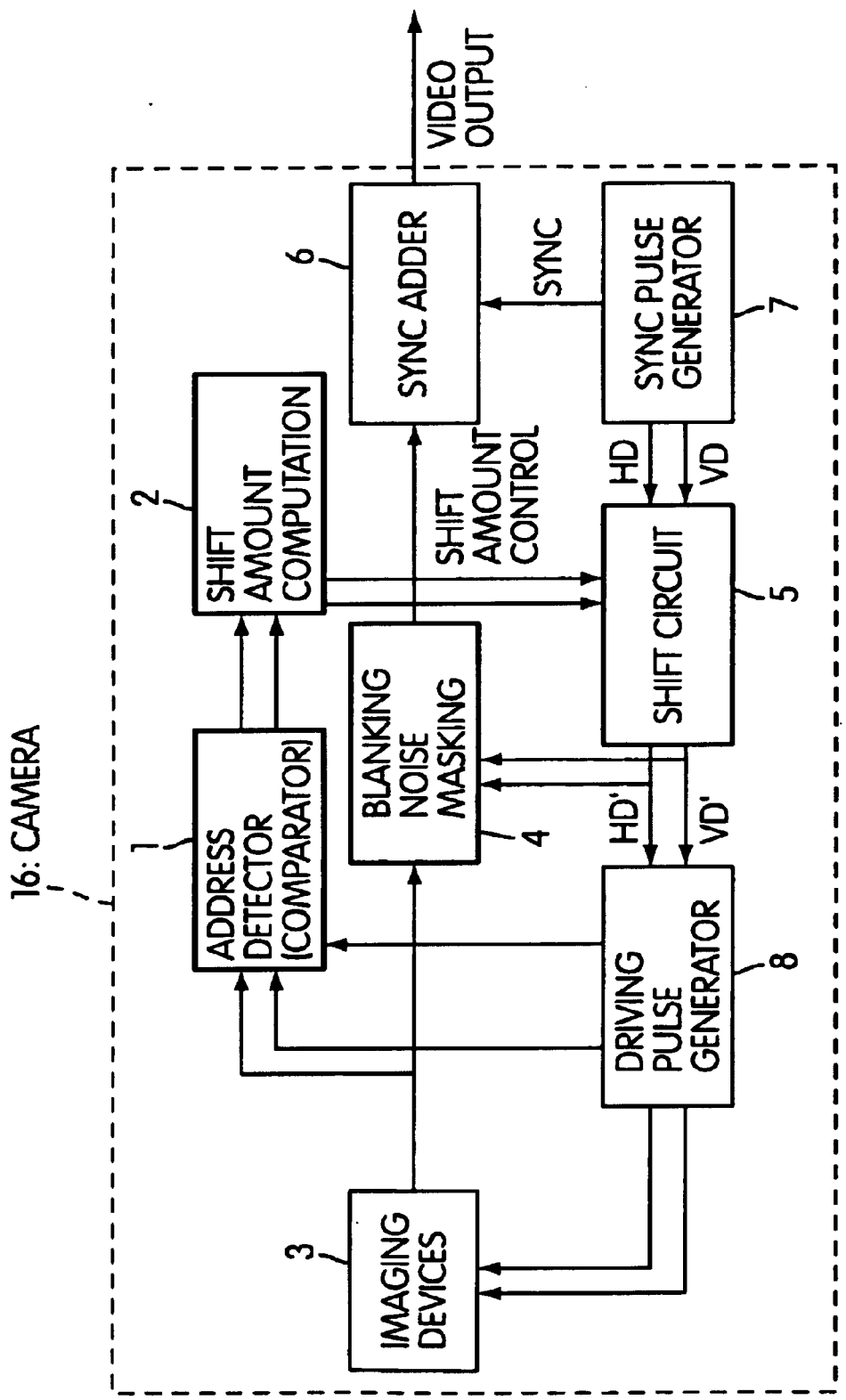

The signal processing system is constructed, as shown in FIG. 2, from an address detector 1, a shift amount computation unit 2, an imaging device 3, a blanking noise masking circuit 4, a shift circuit 5, a sync adder 6, a sync pulse generator 7, and an imaging device driving pulse generator 8. This system can be built into the camera control unit 15 of FIG. 1 except the imaging device 3, as shown in FIG. 3A. Alternatively, the imaging device 3 and the driving pulse generator 8 may be incorporated into the camera head 14 with the other components built in the camera control unit 15. Additionally, all the components may be integrated into a camera 16 as shown in FIG. 3B.

The operation of the system of FIG. 2 will be described next. When light is input to the scope 11 attached to the camera head 14 through the adapter 12, a circular image is displayed on the display screen. FIG. 4A shows a circular image 10a displayed on the display screen 10 of a display unit. In this figure, H is the dimension in the horizontal direction (width) of the display screen and V is the dimension in the vertical direction (height). In the case of FIG. 4, the center of the circular image 10a is off to the lower right of the screen center.

The address detecting operation will be described first. The address detector 1 produces addresses on the display screen of pixel signals from the imaging devices 3 on the basis of horizontal and vertical sync signals HD' and VD' from the imaging device driving pulse generator 8 and an output pixel clock from the imaging device 3. In addition, the address detector makes a comparison between the magnitude of the imaging device output signal and a threshold TH to detect the position of boundary between the object image signal (the circular image 10a) and the other signal. The address detector then determines the minimum address HMIN and the maximum address HMAX in the horizontal direction and the minimum address VMIN and the maximum address VMAX in the vertical direction of pixel signals whose magnitude is above the threshold TH.

The shift amount computation will be described next. The shift amount computation unit 2 determines the shift amounts $\Delta tH$ and $\Delta tV$ by which the circular image 10a is to be shifted horizontally and vertically, respectively, by $$\Delta tH = (H/2) - (HMAX + HMIN)/2$$

$$\Delta tV = (V/2) - (VMAX + VMIN)/2$$

where, as described previously, H is the screen size in the horizontal direction and V is the screen size in the vertical direction.

$\Delta tH$ corresponds to "(H/2)−(HMAX+HMIN)/2" being multiplied by the period of the imaging device output pixel clock. $\Delta tV$ corresponds to "(V/2)−(VMAX+VMIN)/2" being multiplied by the period of the horizontal sync signal HD'.

Next, the phase shift operation will be described. The shift circuit 5 changes the phases of the horizontal and vertical sync signals HD and VD output from the sync signal pulse generator 7 by $\Delta tH$ and $\Delta tV$, respectively, to produce the horizontal and vertical sync signals HD' and VD', which are in turn applied to the imaging device driving pulse generator 8. The pulse generator 8 then produces imaging device driving pulses synchronized with HD' and VD' and drives the imaging device 3.

The sync pulse generator 7 outputs sync signals (SYNC) that conform to NTSC, PAL, or the like to the sync adder 6, which adds the sync signals to a video signal from the imaging device 3. Thus, the video output signal is shifted in phase by $\Delta tH$ and $\Delta tV$ in the horizontal and vertical directions in comparison with without such shift processing. The video output signal of the imaging device contains noise in its blanking portion; thus, the blanking portion of the video output is held at the black level by the blanking noise masking circuit 4.

FIG. 5 shows unprocessed video signal waveform and video signal waveforms processed in accordance with the present invention. FIG. 5A shows an output signal of the imaging device when the phase shift processing of the invention is not carried out. Noise NB is superimposed on the blanking portion of the video output signal containing the circular image 10a. tD is the video display period. Therefore, the noise NB will not appear on the screen.

When the phase shift processing is performed, however, the phase of the video output is shifted as shown in FIG. 5B, which causes the noise NB to be shifted to within the display period tD, resulting in the noise being displayed. The noise masking circuit 4 is therefore adapted to eliminate the noise NB as shown in FIG. 5C. FIG. 5D shows a video output signal after sync signals are added by the sync adder 6 to the noise-free video signal (in this example, only the horizontal sync signal HS is illustrated). The locations at which the signals shown in FIGS. 5B, 5C and 5D are developed are indicated by (b), (c), and (d), respectively.

As a result of the above processing, the center of the circular image 10a which has been off the center of the display screen 10 as shown in FIG. 4A is shifted to the screen center as shown in FIG. 4B and moreover the noise-free image is displayed. It is apparent that the image can be shifted to any position on the display screen.

Thus, the present invention eliminates high-precision part requirements for coupling between the scope 11 and the camera head 14, allowing the cost to reduced. Moreover, the scope and the camera body can be coupled with no adjustment, thus improving productivity. At the time of replacement of the scope and the adapter, variations in their dimensions can be absorbed.

Figure 6A:
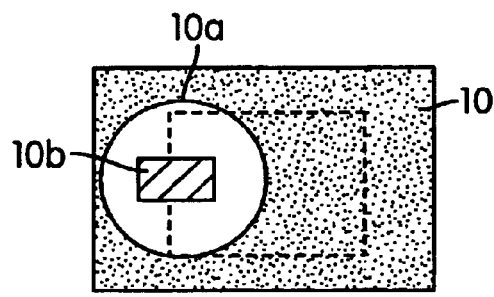
FIGS. 6A through 6D illustrate the effectiveness of the invention when an image is enlarged.
Figure 6B:
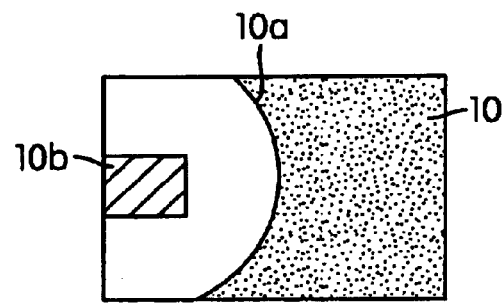
Figure 6C:
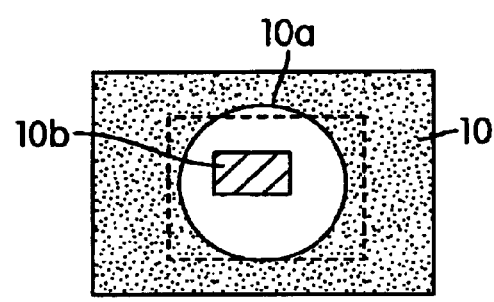
Figure 6D:
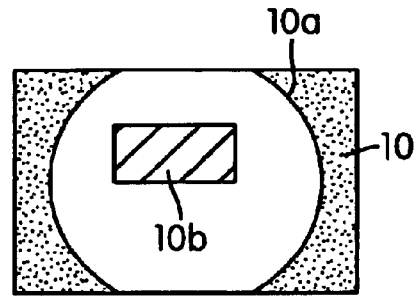
Figure 8:
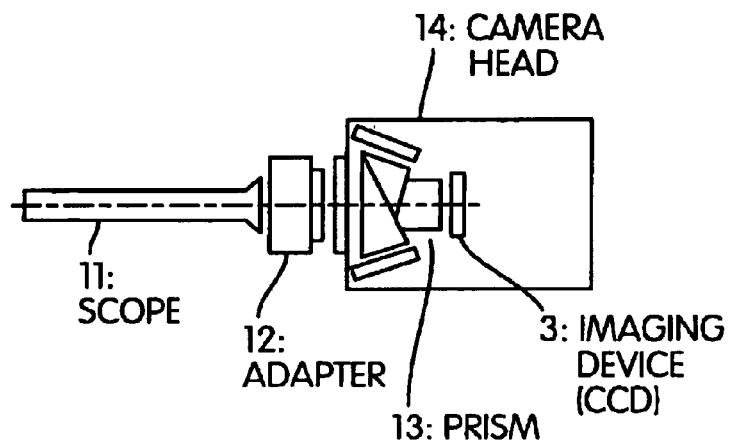
FIG. 8 shows a schematic arrangement of an endscope.

With an endoscope system having an image enlargement feature and using the center of the display screen as the center of enlargement, enlargement of a displayed image which is off the screen center results in further displacement of the image from the screen center. FIGS. 6A and 6B illustrate such a situation. In FIG. 6A, an image 10b of an object to be observed (e.g., a deceased part) is located at the center of the circular image 10a the center of which is off the center of the display screen 10. Enlarging the image of FIG. 6A by a factor of, say, 1.5 with the screen center as the center of enlargement results in such an image as shown in FIG. 6B. The image of FIG. 6B corresponds to the image within an area indicated by dotted lines in FIG. 6A. According to the present invention, however, since the auto-centering function works, the displacement of the displayed image has no effect on the enlargement as shown in FIGS. 6C and 6D.

Next, a second embodiment of the system that implements the auto-centering function of the present invention will be described. In this embodiment, the phase shift of the circular image 10a displayed on the screen 10 is performed through the use of a memory.

Figure 7:
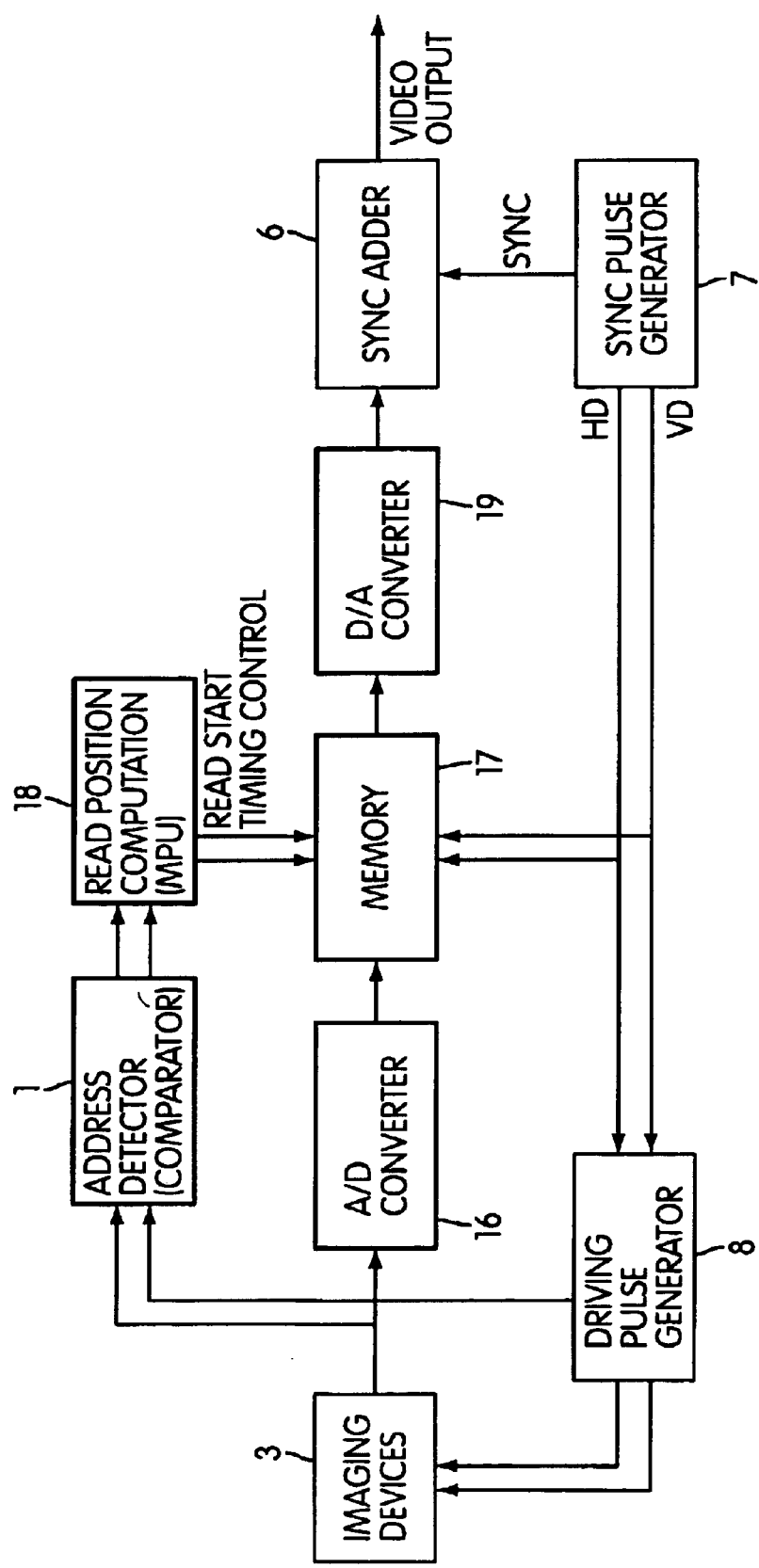
FIG. 7 is a block diagram of a signal processing system according to a second embodiment of the present invention.

FIG. 7 shows a system configuration according to the second embodiment. The imaging device driving pulse generator 8 produces driving pulses from the horizontal and vertical sync signals HD and VD from the sync pulse generator 7 to drive the imaging device 3. The imaging device outputs an analog video signal corresponding to an image focused on its photosensitive surface. An analog-to-digital (A/D) converter 16 converts the analog video signal from the imaging device into a digital video signal, which is in turn written into a memory 17 under the control of a controller not shown.

The address detector 1, as in the first embodiment, makes a comparison between the magnitude of the video signal from the imaging device 3 and a threshold TH and then determines the minimum address HMIN and the maximum address HMAX in the horizontal direction and the minimum address VMIN and the maximum address VMAX in the vertical direction of the circular image 10a.

A read position computation unit 18, like the shift amount computation unit 2, computes the horizontal and vertical address shift amounts $\Delta aH$ and $\Delta aV$ of the circular image 10a by $$\Delta aH = (H/2) - (HMAX + HMIN)/2$$

$$\Delta aV = (V/2) - (VMAX + VMIN)/2$$

The read position computation unit 18 then reads one frame of video data from the memory 17 with the row and column addresses shifted by $\Delta aH$ and $\Delta aV$, respectively. The video data read from the memory 17 is converted into an analog form by a digital-to-analog (D/A) converter 19 and the resulting analog signal is then added with sync signals in the sync adder 6. Thus, the video output becomes shifted in phase by $\Delta aH$ and $\Delta aV$ in comparison with without shifting of memory addresses.

Shifting the read start timing results in data in storage locations where no video data has been written into being output as video data. Such data in the storage locations in the memory is converted into a fixed value the same as the black level (When read from the memory, such data is fixed at the black level).

The sync adder 6 adds sync signals to the video signal from the memory 17 to provide a video output signal.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image pickup apparatus which uses an imaging device for producing an imaging device output signal containing an object image signal representing an object image focused on its photosensitive surface which is larger than the object image and provides a video output signal corresponding to the object image, comprising:

a detector configured to detect the position of boundary between the object image signal and the other signal in the imaging device output signal in accordance with their difference in magnitude;

a shift amount computing unit configured to compute shift amounts that are required to display the object image on a display screen such that a center of an object image display area coincides with a center of the display screen, based on the boundary position detected by the detector;

a sync signal generator that generates horizontal and vertical sync signals to be added to the video output signal;

a shift circuit configured to shift phases of the horizontal and vertical sync signals generated by the sync signal generator based on the shift amounts computed by the shift amount computing unit;

a driving pulse generator that generates driving pulses to drive the imagine device, based on the horizontal and vertical sync signals shifted by the shift circuit; and a sync adder configured to add the horizontal and vertical sync signals generated by the sync signal generator to the imaging device output signal to provide the video output signal.

2. The apparatus according to claim 1, wherein the image pickup apparatus is an endoscope.

3. The apparatus according to claim 1, wherein the shift amount computing unit:

(i) detects horizontal-direction minimum address HMIN of the object image signal, horizontal-direction maximum address HMAX of the object image signal, vertical-direction minimum address VMIN of the object image signal, and vertical-direction maximum address VMAX of the object image signal, and (ii) computes a horizontal-direction shift amount $\Delta tH$ and a vertical-direction shift amount $\Delta tV$ according to formulas below:

$$\Delta tH = (H/2) - (HMAX + HMIN)/2$$

$$\Delta tV = (V/2) - (VMAX + VMIN)/2$$

where H is a horizontal-direction image size of the screen and V is a vertical-direction image size of the screen.

4. An image pickup apparatus which uses an imaging device for producing an imaging device output signal containing an object image signal representing an object image focused on its photosensitive surface which is larger than the object image and provides a video output signal corresponding to the object image, comprising a detector configured to detect the position of boundary between the object image signal and the other signal in the imaging device output signal in accordance with their difference in magnitude;

a shift amount computing unit configured to compute shift amounts required to display the object image on a display screen such that a center of an object image display area coincides with a center of the display screen, based on the boundary position detected by the detector;

a sync signal generator that generates sync signals to be added to the video output signal;

a driving pulse generator that generates driving pulses to drive the imaging device, based on the sync signals generated by the sync signal generator;

a memory configured to store image data corresponding to the imaging device output signal from the imaging device;

a reading unit configured to read the image data from the memory while shifting the addresses of the memory in which one frame of image data has been written according to the shift amounts computed by the shift amount computation unit; and a sync adder configured to add the sync signals generated by the sync signal generator to an image signal corresponding to the image data read out from the memory to provide the resulting signal as the video output signal.

5. An image pickup apparatus comprising:

an imaging device configured to produce an imaging device output signal containing an object image signal representing an image of an object focused on its photosensitive surface which is larger than the object image;

the a detector configured to detect the position of boundary between the object image signal and the other signal in the imaging device output signal in accordance with their difference in magnitude;

a shift amount computing unit responsive to the boundary position detected by the detector which computes shift amounts required to display the object image such that a center of an object image display area coincides with a center of the display screen;

a sync signal generator that generates horizontal and vertical sync signals to be added to the video output signal;

a shift circuit configured to shift the phases of horizontal and vertical sync signals generated by the sync signal generator based on the shift amounts computed by the shift amount computing unit;

a driving pulse generator that generates driving pulses to drive the imaging device, based on the horizontal and vertical sync signals shifted by the shift circuit; and a sync adder adding the horizontal and vertical sync signals generated by the sync signal generator to the imaging device output signal to provide the video output signal.

6. The apparatus according to claim 5, further comprising a masking circuit masking noise in the blanking portions of the imaging device output signal.

7. An image pickup apparatus which uses an imaging device for producing an imaging device output signal containing an object image signal representing an object image focused on its photosensitive surface which is larger than the object image and provides a video output signal corresponding to the object image, comprising:

detecting means for detecting the position of boundary between the object image signal and the other signal in the imaging device output signal in accordance with their difference in magnitude;

shift amount computing means responsive to the boundary position detected by the detecting means for computing shift amounts required to display the object image on a display screen such that a center of an object image display area coincides with a center of the display screen;

sync signal generating means for generating sync signals to be added to the video output signal;

a shift circuit for shifting the phases of horizontal and vertical sync signals generated by the sync signal generating means in accordance with the shift amounts computed by the shift amount computing means;

driving pulse generating means for generating driving pulses to drive the imaging device, based on the horizontal and vertical sync signals shifted by the shift circuit; and sync adding means for adding the sync signals generated by the sync signal generating means to the imaging device output signal to provide the video output signal.

8. The apparatus according to claim 7, further comprising masking circuit means for masking noise in the blanking portions of the imaging device output signal.

9. An image pickup apparatus which uses an imaging device for producing an imaging device output signal containing an object image signal representing an object image focused on its photosensitive surface which is larger than the object image and provides a video output signal corresponding to the object image comprising:

detecting means for detecting the position of boundary between the object image signal and the other signal in the imaging device output signal in accordance with their difference in magnitude;

shift amount computing means which computes shift amounts required to display the object image on a display screen such that a center of an object image display area coincides with a center of the display screen;

sync signal generating means for generating sync signals to be added to the video output signal;

driving pulse generating means for generating driving pulses to drive the imaging device, based on horizontal and vertical sync signals generated by the sync signal generating means; and storage means for storing image data corresponding to the imaging device output signal from the imaging device;

read means for reading the image data from the storage means while shifting the addresses of the storage means in which one frame of image data has been written according to the shift amounts computed by the shift amount computation means; and sync adding means for adding the sync signals generated by the sync signal generating means to an image signal corresponding to the image data read out from the storage means and providing the resulting signal as the video output signal.

10. The apparatus according to claim 9, further comprising a masking circuit masking noise in the blanking portions of the imaging device output signal.

11. A method for providing a video output signal corresponding to an image of an object using an imaging device for producing an imaging device output signal containing an object image signal representing the object image focused on its photosensitive surface which is larger than the object image comprising:

detecting the position of boundary between the object image signal and the other signal in the imaging device output signal in accordance with their difference in magnitude;

computing shift amounts required to display the object image on a display screen such that a center of an object image display area coincides with a center of the display screen according to the boundary position detected; and generating horizontal and vertical sync signals for the video output signal;

shifting the phases of the horizontal and vertical sync signals in accordance with the shift amounts;

generating driving pulses to drive the imaging device, based on the shifted horizontal and vertical sync signals; and adding the generated sync signals to the imaging device output signal to provide the video output signal.

12. The method according to claim 11, wherein said computing shift amounts comprises:

(i) detecting horizontal-direction minimum address HMIN of the object image signal, horizontal-direction maximum address HMAX of the object image signal, vertical-direction minimum address VMIN of the object image signal, and vertical-direction maximum address VMAX of the object image signal; and (ii) computing a horizontal-direction shift amount ΔtH and a vertical-direction shift amount ΔtV according to formulas below:

$$\Delta tH = (H/2) - (H\text{MAX} + H\text{MIN})/2$$

$$\Delta tV = (V/2) - (V\text{MAX} + V\text{MIN})/2$$

where H is a horizontal-direction image size of the screen and V is a vertical-direction image size of the screen.

13. A method for providing a video output signal corresponding to an image of an object using an imaging device for producing an imaging device output signal containing an object image signal representing the object image focused on its photosensitive surface which is larger than the object image comprising:

detecting the position of boundary between the object image signal and the other signal in the imaging device output signal in accordance with their difference in magnitude;

computing shift amounts required to display the object image on a display screen such that a center of an object image display area coincides with a center of the display screen according to the boundary position detected;

generating horizontal and vertical sync signals for the video output signal;

generating driving pulses to drive the imaging device, based on the horizontal and vertical sync signals;

storing image data corresponding to the imaging device output signal from the imaging device in a memory;

reading the image data from the memory while shifting the addresses of the memory in which one frame of image data has been written according to the shift amounts computed; and adding the horizontal and vertical sync signals to an image signal corresponding to the image data read out from the memory and providing the resulting signal as the video output signal.

* * * * *